US009131081B2

United States Patent
Wang et al.

(10) Patent No.: US 9,131,081 B2
(45) Date of Patent: Sep. 8, 2015

(54) METHOD FOR SYNCHRONOUSLY IMPLEMENTING MEDIA SWITCH IN GATEWAYS USED FOR FAX OVER IP NETWORK

(75) Inventors: Yi Wang, Shenzhen (CN); Xiaoqu Zhang, Shenzhen (CN); Xin Lu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 1374 days.

(21) Appl. No.: 11/573,778

(22) PCT Filed: Jun. 16, 2005

(86) PCT No.: PCT/CN2005/000868
§ 371 (c)(1),
(2), (4) Date: Feb. 15, 2007

(87) PCT Pub. No.: WO2006/017969
PCT Pub. Date: Feb. 23, 2006

(65) Prior Publication Data
US 2007/0211302 A1   Sep. 13, 2007

(30) Foreign Application Priority Data
Aug. 17, 2004   (CN) .......................... 2004 1 0059172

(51) Int. Cl.
*G06K 15/00*   (2006.01)
*H04N 1/00*   (2006.01)
(Continued)

(52) U.S. Cl.
CPC ........ *H04N 1/00214* (2013.01); *H04L 12/6418* (2013.01); *H04L 12/66* (2013.01);
(Continued)

(58) Field of Classification Search
CPC .............. H04N 2201/0022; H04N 2201/0024; H04M 7/1245; H04M 7/125; H04M 7/126; H04M 7/1265; H04M 2203/2066
USPC ................................ 358/1.14, 1.15, 407, 409
See application file for complete search history.

(56) References Cited

U.S. PATENT DOCUMENTS 6,549,587 B1 *   4/2003   Li ................................... 375/326
7,180,892 B1 *   2/2007   Tackin .......................... 370/389
(Continued)

FOREIGN PATENT DOCUMENTS
WO           9858492      12/1998

OTHER PUBLICATIONS
Schulzrinne et al., "RTP: A Transport Protocol for Real-Time Applications", RFC 1889, Jan. 1996.*

*Primary Examiner* — King Poon
*Assistant Examiner* — Vincent Peren
(74) *Attorney, Agent, or Firm* — Workman Nydegger

(57) ABSTRACT

A method for synchronously implementing media switch in gateways used for IP FAX is disclosed. The method comprises sending a message for notification of fax event from a media gateway which firstly detects a fax event to the other media gateway of the fax event; implementing a media switch in the media gateway which firstly detects the fax event into fax mode; implementing a media switch in the other media gateway of the fax event into fax mode after receiving said message for notification of fax event. Therefore, the method of the invention overcomes the disadvantages of the related art and more particularly prevents fax failure due to difference of routing for a born network and cross-domain. The IP FAX used by the method of the invention can be applied broadly as the method also improves compatibility and reliability for IP FAX.

9 Claims, 3 Drawing Sheets

(51) Int. Cl.

| | | |
|---|---|---|
| *H04N 1/36* | (2006.01) | |
| *H04N 1/327* | (2006.01) | |
| *H04M 7/12* | (2006.01) | |
| *H04L 12/66* | (2006.01) | |
| *H04L 12/64* | (2006.01) | |
| *H04L 29/06* | (2006.01) | |
| *H04L 29/08* | (2006.01) | |

(52) U.S. Cl.
CPC ............ *H04L 65/103* (2013.01); *H04L 67/12* (2013.01); *H04M 7/125* (2013.01); *H04M 7/126* (2013.01); *H04M 7/1245* (2013.01); *H04M 7/1265* (2013.01); *H04N 1/0022* (2013.01); *H04N 1/00209* (2013.01); *H04N 1/00281* (2013.01); *H04N 1/00312* (2013.01); *H04N 1/32713* (2013.01); *H04N 1/32719* (2013.01); *H04N 1/32721* (2013.01); *H04N 1/32726* (2013.01); *H04N 1/32797* (2013.01); *H04M 2203/2066* (2013.01); *H04N 1/32704* (2013.01); *H04N 2201/0022* (2013.01); *H04N 2201/0024* (2013.01)

(56) References Cited

U.S. PATENT DOCUMENTS

| | | | |
|---|---|---|---|
| 7,684,383 B1* | 3/2010 | Thompson et al. | 370/352 |
| 2002/0114017 A1* | 8/2002 | Ono et al. | 358/426.04 |
| 2003/0002476 A1* | 1/2003 | Chung et al. | 370/352 |
| 2003/0097483 A1* | 5/2003 | Owerfeldt | 709/312 |
| 2003/0123097 A1* | 7/2003 | Fruth | 358/400 |
| 2003/0123466 A1* | 7/2003 | Somekh et al. | 370/401 |
| 2003/0193696 A1* | 10/2003 | Walker et al. | 358/402 |
| 2004/0028039 A1* | 2/2004 | Miao | 370/389 |
| 2004/0042031 A1 | 3/2004 | Abrishami et al. | |

* cited by examiner

METHOD FOR SYNCHRONOUSLY IMPLEMENTING MEDIA SWITCH IN GATEWAYS USED FOR FAX OVER IP NETWORK

FIELD OF THE INVENTION

The present invention relates to technology of fax over IP network, and more particularly to a method for implementing media switch in gateways by a manner of synchronization in order to assure that FAX over IP network (IP FAX) can be applied reliably.

DESCRIPTION OF THE BACKGROUND ART

Long-distance telephone charges of IP FAX can be reduced by comparing with that of FAX based on the conventional public switched telephone network. With an application of next generation network (NGN), IP FAX will be popularized quickly. The process for switching voice signal to fax signal of the conventional technology of IP FAX is impossible to avoid. It is no doubt that the normal process of fax can be affected if the process for switching signal can not be implemented in a manner of synchronization. Therefore, an application of IP FAX lies on whether the synchronous switch can be conducted reasonably and thoroughly.

Certainly, whether events can be transmitted smoothly by fax also depends on whether fax machines themselves as to be communicated each other are compatible. However, it is impossible for IP FAX of the prior art to implement a thorough testing for compatibility relation between IP Fax technology and each kind of fax machines, as a variety of fax machines have been already used. It is also unpredictable for fax machines what performance parameters will be developed in future. Meanwhile, the media switch is a necessary process for implementing an application of IP FAX. Therefore, it has been already a key technology how to make both media gateways at transmitting side and receiving side of fax event implement media switch synchronously so as to improve rate of successful transmission by fax.

Methods for implementing media switch for IP FAX are already disclosed. As a kind of methods of the prior art, whether a fax event can be detected at time division multiplex side (TDM) is considered to be the unique condition for switching. However, it is possible for the media gateway at transmitting side or at receiving side to be unable to detect a fax event, for the fax machine at transmitting side could not active V.21 signal (based on the 300 bps fax operation standard, ITU-T V.21) before receiving a whole V.21 signal transmitted from the fax machine at receiving side due to the requirement that fax signals at both sides need to be coupled each other. In case of this situation occurred, failure for media switch will be resulted in.

Another method is disclosed in the prior art that such a media switch is controlled by a media gateway controller. According to this kind of method, signaling is simply guaranteed to be sent at the same time from the MGC. Obviously, the media switches implemented by different gateways could not be synchronous once the routes between the MGC and the media gateway at transmitting side and between the MGC and the media gateway at receiving side are different, as the signaling could not reach each gateway at the same time. Therefore, the method for media switch of the prior art could result in failure of transmission for fax event due to time difference.

SUMMARY OF THE INVENTION

An object of the present invention is to provide a method for synchronously implementing media switch between gateways at the two sides of fax event based on IP FAX. The media switch of the invention is respectively conducted by the gateways at transmitting side and at receiving side in an initiate phase for fax so as to assure that the fax event can be transmitted safely.

A method for synchronously implementing media switch in gateways used for IP FAX comprises sending a message for notification of fax event from a media gateway which firstly detects a fax event to the other media gateway of the fax event; implementing a media switch in the media gateway which firstly detects the fax event into fax mode; implementing a media switch in the other media gateway of the fax event into fax mode after receiving said message for notification of fax event.

According to the method, the step of sending a message for notification of fax event to the other media gateway of the fax event comprises identifying that the fax event is occurred by the media gateway after receiving a signal sent from a fax machine communicated with the media gateway; notifying the other media gateway of the fax event that the fax event is occurred by sending a message to the other media gateway.

The gateway at transmitting side and the gateway at receiving side respectively identifies that the fax event is occurred by a calling tone signal and a called station identification signal as received.

The step of notifying the other media gateway of the fax event comprises notifying the gateway at transmitting side after the gateway at receiving side receiving a called station identification signal if the fax machine at receiving side is firstly activated; notifying the gateway at receiving side after the gateway at transmitting side receiving a calling tone signal if a fax machine at receiving side is firstly activated.

The fax mode may comprise a mode for voice band data and a mode for T.38 standard. Additionally, the message for notification of fax event can be sent in RFC2833 format or in NoticePacket format. The message for notification of fax event is carried by an Application-defined RTCP packet if the message in NoticePacket format. Also, a redundancy that accommodates the Definite Standard of RTP Payload for Redundant Audio Data can be used for notifying fax event.

Preferably, the media switch in gateway is conducted according to a V.21 preamble signal as received According to the method of the present invention, media switches in the media gateways of the fax event can be conducted synchronously only by sending a message from one of gateways to the other. Therefore, the method of the invention overcomes the disadvantages of the related art and more particularly prevents fax failure due to difference of routing for a born network and cross-domain. The IP FAX used by the method of the invention can be applied broadly as the method also improves compatibility and reliability for IP FAX.

Detail description of the present invention which is not used to limit the present invention will be given hereinafter by combining the accompanying figures and embodiments.

DETAILED DESCRIPTION OF THE PREFERRED EMBODIMENTS

Figure 1:
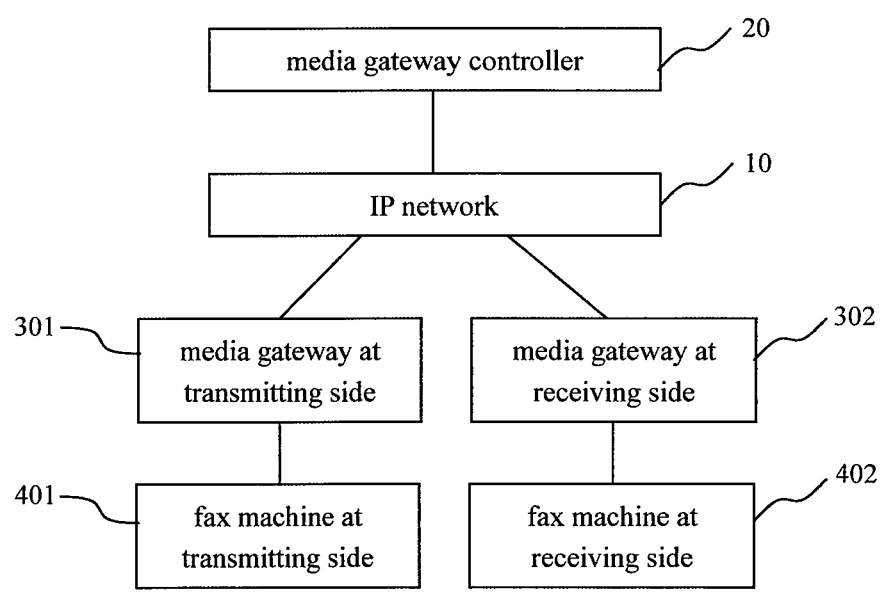
FIG. 1 is a system networking diagram of the present invention.

As shown in FIG. 1, a system used for IP FAX according to the method for synchronously implementing media switch of the present invention at least comprises a IP network 10; a media gateway controller 20 which communicates with the IP network 10; two media gateways which also communicate with the IP network 10, including a media gateway at transmitting side 301 and a media gateway at receiving side 302; and fax machines 401 and 402 which are connected to the media gateway at transmitting side 301 and the media gateway at receiving side 302 respectively.

To complete a transmission of fax event by IP FAX, the process of transmission is divided into a plurality of phases from a whole, such as a phase of establishment for call, an initiate phase for fax, a phase of fax mode etc. The media gateway controller 20 is used for controlling the two media gateways 301 and 302 so as to complete the establishment and release of a call in the phase of establishment for call. In next phase, i.e. the initiate phase for fax, either of the media gateways 301 and 302 can be used for detecting whether a fax event is occurred. If one of the media gateways 301 and 302 detects that a fax event is occurred at first, the one will conduct media switch after sending a message for notification of fax event to the other on due time. Accordingly, the other of the gateways 301 and 302 can also conduct media switch on time once receiving the message for notification of fax event as sent. Thereby, the system completes the preparation for transmitting fax event by IP FAX, and then enters into the phase of fax mode. In the phase of fax mode, the fax machine at transmitting side 401 sends the fax event by communicating with the gateway at transmitting side 301; the fax machine at receiving side 402 can simultaneously receive the fax event by communicating with the media gateway at receiving side 302.

According to the method of the invention, anyone of a calling tone (CNG) signal, a called station identification (CED) signal and a V.21 preamble signal may act as a sign for identifying that a fax event is occurred. As a kind of signals born on single frequency, the CNG signal and the CED signal may be disturbed sometimes. The V.21 preamble signal is preferably chosen for identifying the fax event occurred so as to conduct media switch.

Additionally, to assist in the description of the method of the present invention, standards such as Definition Standard of RTP Payload for Named Telephone Events, Standard for Sending FAX over IP Networks in a Real-time Mode for the Third Type of Fax Machine and a Definition Standard of RTP Payload for Redundant Audio Data are used to describe the accompanying figures.

Now referring to FIG. 1 and FIG. 2, an illustrated embodiment for implementing media switch in two gateways 301 and 302 will be described in detail.

Suppose that the media gateways support Definition Standard of RTP Payload for Named Telephone Events and can transmit and receive a message for notification of fax event in RFC2833 format that accommodates the Definition Standard of RTP Payload for Named Telephone Events. After a fax event is occurred, an establishment for call should be implemented in the first phase, i.e. the phase of establishment for call. Next, it is possible for either of the gateways to detect the fax event occurred.

Figure 2:
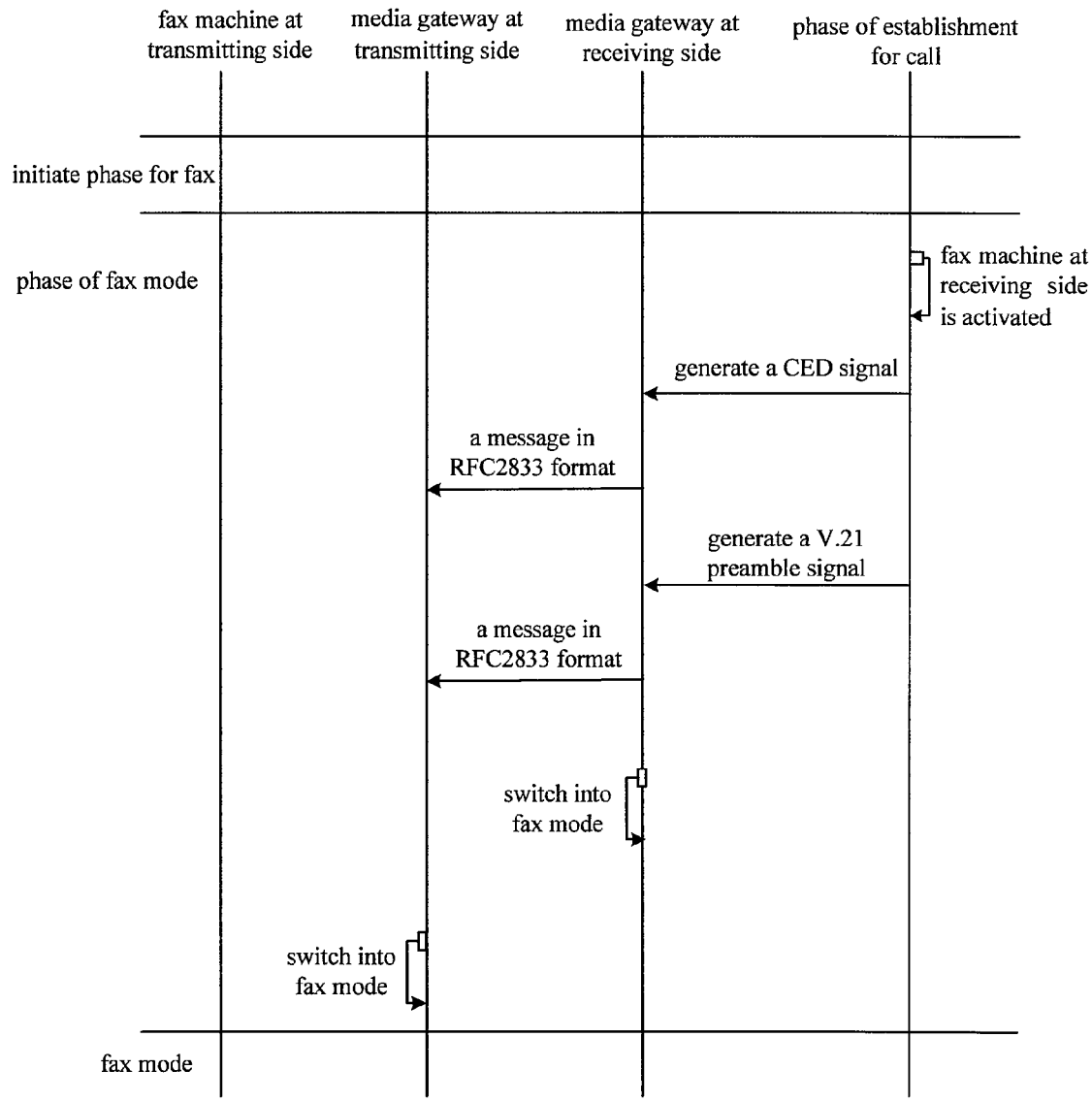
FIG. 2 is a flow chart according to an embodiment of the present invention in which a fax machine at receiving side firstly actives a fax signal.

If the fax machine at receiving side 402 as shown in FIG. 2 is firstly activated by a fax event, the fax machine at receiving side 402 generates a CED signal and simultaneously sends the same to the gateway at receiving side 302. The gateway 302 can identify that the fax event has been already occurred after receiving the CED signal and further sends a message for notification of fax event in RFC2833 format to the gateway at transmitting side 301. Then, the fax machine 402 further generates a V.21 preamble signal and simultaneously sends the same to the gateway at receiving side 302. Preferably, the gateway 302 conducts a media switch after receiving the V.21 preamble signal as the V.21 preamble signal acts as a sign for switching; on the other hand, the gateway 302 further sends a message for notification of V.21 event in RFC2833 format to the gateway at transmitting side 301. Eventually, the gateway at transmitting side 301 conducts a media switch once the message for notification of V.21 event reaches the gateway 301.

Figure 3:
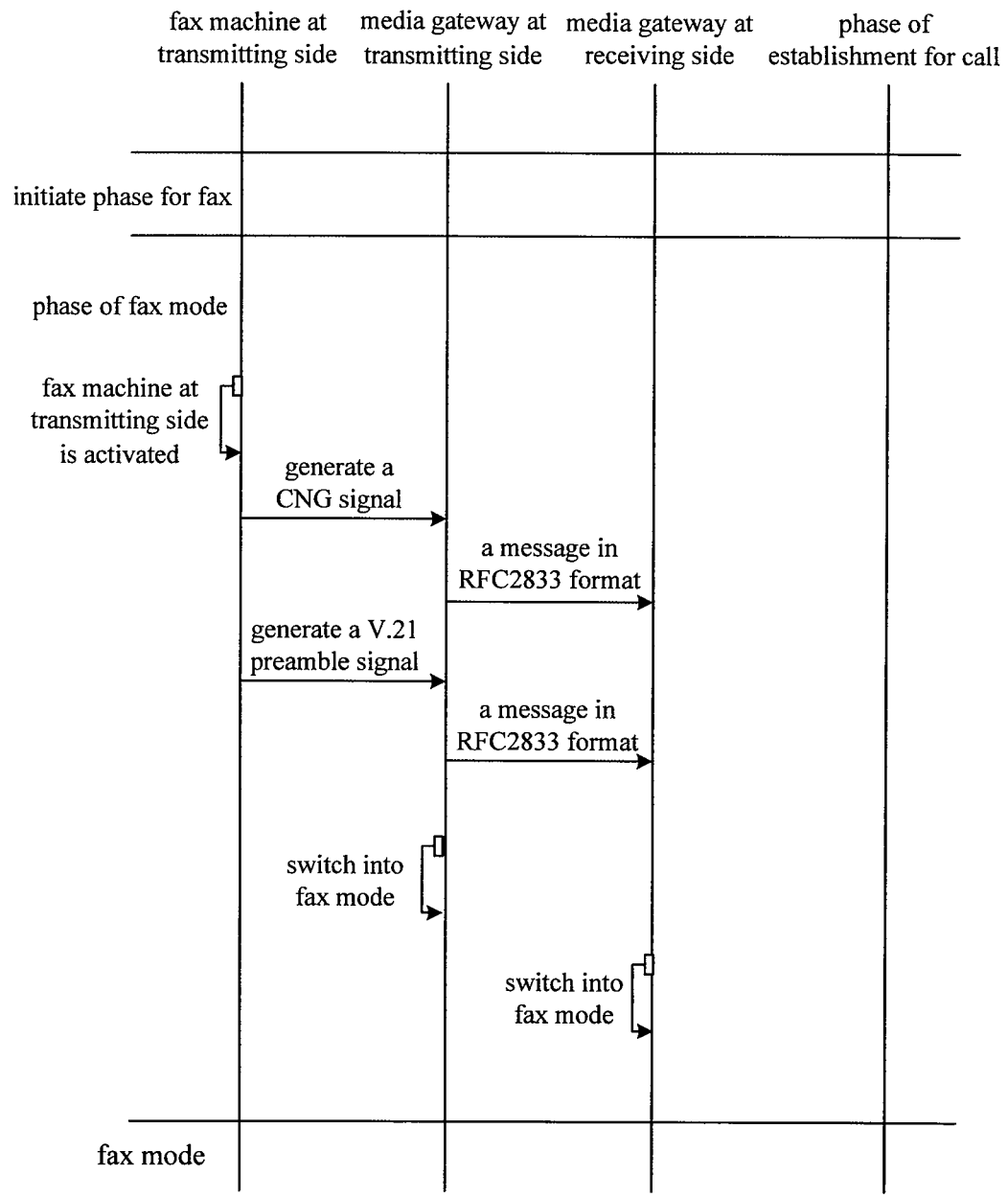
FIG. 3 is a flow chart according to another embodiment of the present invention in which a fax machine at transmitting side actives a fax signal.

Alternately, the fax machine at transmitting side 401 as shown in FIG. 3 can be firstly activated by a fax event. If so, the fax machine at transmitting side 401 generates a CNG signal and simultaneously sends the same to the gateway at transmitting side 301. The gateway 301 can identify that the fax event has been already occurred after receiving the CNG signal and further sends a message for notification of fax event in RFC2833 format to the gateway at receiving side 302. Then, the fax machine 401 further generates a V.21 preamble signal and simultaneously sends the same to the gateway at transmitting side 301. Preferably, the gateway 301 conducts a media switch after receiving the V.21 preamble signal as the V.21 preamble signal acts as a sign for switching; on the other hand, the gateway 301 further sends a message for notification of V.21 event in RFC2833 format to the gateway at receiving side 302. Eventually, the gateway at receiving side 302 conducts a media switch once the message for notification of V.21 event reaches the gateway 302.

Actually, the fax mode may comprise a mode for voice band data and a mode for T.38 standard, i.e., a Standard for Sending FAX over IP Networks in a Real-time Mode for the Third Type of Fax Machine.

However; it would be appreciated that the message for notification of fax event may be replaced by redundancy in RFC2198 format that accommodates the Definite Standard of RTP Payload for Redundant Audio Data according to the second embodiment of the invention so as to avoid the affect from the network. Sometimes, the network may operate in a bad status. For example, the rate for missing packets may be higher than 5% under the bad status. Herein, another steps of the second embodiment would not be described in detail, as these steps are as same as that of the first embodiment.

There are another kinds of media gateways that cannot support messages in RFC2833 format to be transmitted. According to the third embodiment of the invention, a message for notification of fax event can be used NoticePacket format instead of RFC2833 format. Herein, another steps of the third embodiment would not be described in detail, as these steps are as same as that of the first embodiment A message in NoticePacket format may accommodate Real-time Transport Protocol (RTP), Real-time Transport Control Protocol (RTCP) or User Datagram Protocol Transport Layer (UDPTL). However, RTP and UDPTL are used for forming carriers of media flow, but not for controlling. Therefore, a message for application-defined RTCP packet (APP) that accommodates RTCP is suitable for exchanging. By using RTCP, an advantage is that the structure of message for APP is flexible as it may be user-defined. Additionally, the risk of fax failure may be lowed to minimum for the message for APP won't affect the usage of MG which doesn't support the transmission of APP.

The massive statistics based on testing for operation status of network shows that the reliability rate of implementing synchronously media switch of the method of the invention can reach 100%; the misdetection rate can be lowered to 0%.

Apparently, the present invention has other various embodiments. And it will be apparent to those skilled in the art that various modifications and variations can be made, thus it is intended that the present invention cover the modifications and variations of this invention provided they come within the scope of the appended claims and their equivalents.

What is claimed is:

1. A method for synchronously implementing media switch in gateways used for IP FAX between two fax machines, comprising:
    generating a fax signal by the fax machine which is firstly activated by a fax event;
    identifying that the fax event occurred after a media gateway, which is communicating with the fax machine firstly activated, receives the fax signal;
    sending a message for notification of fax event to the other media gateway of the fax event, wherein the message for notification of fax event is carried by an Application-defined RTCP packet;
    implementing a media switch in the media gateway into fax mode; and
    implementing a media switch in the other media gateway of the fax event into fax mode after receiving the message for notification of fax event; the method further comprising:
    the step of sending the fax signal to the media gateway if the communicated fax machine is firstly activated to generate the fax signal, and
    the step of sending a CED signal to the media gateway at a fax receiving side if the fax machine is firstly activated at the fax receiving side.

2. The method according to claim 1, further comprising a step of sending a V.21 preamble signal to the media gateway at the fax receiving side by the fax machine at the fax receiving side.

3. The method according to claim 2, wherein the V.21 signal acts as a sign on which the media switch is implemented in the media gateway at the fax receiving side.

4. The method according to claim 3, further comprising steps of:
    implementing a media switch in the media gateway at the fax receiving side when receiving the V.21 signal;
    sending the message for notification of V.21 event to the other media gateway at the fax transmitting side; and
    implementing a media switch in the other media gateway at the fax transmitting side when receiving the message for notification of V.21 event.

5. The method according to claim 1, further comprising a step of sending a CNG signal to the media gateway at a fax transmitting side if the fax machine is firstly activated at the fax transmitting side.

6. The method according to claim 5, further comprising a step of sending a V.21 preamble signal to the media gateway at the fax transmitting side by the fax machine at the fax transmitting side.

7. The method according to claim 6, wherein the V.21 signal acts as a sign on which the media switch is implemented in the media gateway at the fax receiving side.

8. The method according to claim 7, further comprising steps of:
    implementing a media switch in the media gateway at the fax transmitting side when receiving the V.21 signal;
    sending the message for notification of V.21 event to the other media gateway at the fax receiving side; and
    implementing a media switch in the other media gateway at the fax receiving side when receiving the message for notification of V.21 event.

9. The method according to claim 1, wherein a redundancy that accommodates the Definite Standard of RTP Payload for Redundant Audio Data is used for notifying fax event.

* * * * *